(12) United States Patent
Daura Luna et al.

(10) Patent No.: US 7,378,947 B2
(45) Date of Patent: May 27, 2008

(54) DEVICE AND METHOD FOR THE ACTIVE MONITORING OF THE SAFETY PERIMETER OF A MOTOR VEHICLE

(75) Inventors: Francesc Daura Luna, Sant Quirze del Vallès (ES); Daniel Bande Martinez, Vilanova I la Geltrú (ES); Andrea Saccagno, Turin (IT)

(73) Assignee: Fico Mirrors, S.A., Barcelona (ES)

( * ) Notice: Subject to any disclaimer, the term of this patent is extended or adjusted under 35 U.S.C. 154(b) by 252 days.

(21) Appl. No.: 10/521,332

(22) PCT Filed: Jul. 17, 2002

(86) PCT No.: PCT/EP02/00364

§ 371 (c)(1),
(2), (4) Date: Aug. 17, 2005

(87) PCT Pub. No.: WO01/61371

PCT Pub. Date: Aug. 23, 2001

(65) Prior Publication Data
US 2006/0152351 A1    Jul. 13, 2006

(51) Int. Cl.
*B60Q 1/00* (2006.01)
(52) U.S. Cl. .............. 340/435; 180/167; 180/169
(58) Field of Classification Search ............ 340/435, 340/436, 903; 180/167, 169
See application file for complete search history.

(56) References Cited

U.S. PATENT DOCUMENTS

| 5,172,317 A | * | 12/1992 | Asanuma et al. | ........... 180/169 |
| 5,424,952 A | | 6/1995 | Asayama | |
| 5,661,651 A | | 8/1997 | Geschke et al. | |
| 5,699,057 A | | 12/1997 | Ikeda et al. | |
| 5,929,786 A | * | 7/1999 | Schofield et al. | ........... 340/435 |
| 6,288,774 B1 | * | 9/2001 | Takubo et al. | .............. 180/167 |

(Continued)

FOREIGN PATENT DOCUMENTS

DE    199 10 153 A1    1/2001

(Continued)

OTHER PUBLICATIONS

International Search Report for PCT/ES/02/00364 mailed Nov. 5, 2002.

*Primary Examiner*—John Tweel, Jr.
(74) *Attorney, Agent, or Firm*—RatnerPrestia

(57) ABSTRACT

The invention relates to a device for the active monitoring of the safety perimeter of a motor vehicle, which is used to detect moving objects or static obstacles inside said safety perimeter. The inventive device includes a first sensor which covers a first detection zone comprising at least part of a blind angle of the vehicle and which sends input signals to an information-processing device which generates output signals for means used to alert the driver. Moreover, the device also includes at least one second sensor which covers a second detection zone and which forms one unit with the aforementioned first sensor. According to the invention, the first and second sensors co-operate in order to cover a combined detection zone containing the blind angle, which is increased in relation to the zone covered by the first sensor and which forms a section of the safety perimeter. The above-mentioned unit comprising the first and at least one second sensor use the same alarm means.

34 Claims, 6 Drawing Sheets

U.S. PATENT DOCUMENTS

| | | |
|---|---|---|
| 6,580,385 B1 | 6/2003 | Winner et al. |
| 6,727,808 B1 * | 4/2004 | Uselmann et al. .......... 340/436 |
| 6,803,858 B2 * | 10/2004 | Whitted ...................... 340/435 |
| 6,850,385 B1 * | 2/2005 | Woods ................... 360/77.04 |
| 6,927,677 B2 * | 8/2005 | Anderson et al. ........... 340/435 |
| 7,061,373 B2 * | 6/2006 | Takahashi ................... 340/435 |
| 7,161,472 B2 * | 1/2007 | Strumolo et al. .......... 340/436 |
| 7,233,233 B2 * | 6/2007 | Taniguchi et al. .......... 340/435 |
| 2001/0045981 A1 | 11/2001 | Gloger et al. |
| 2004/0010402 A1 | 1/2004 | Reitman et al. |

FOREIGN PATENT DOCUMENTS

| | | |
|---|---|---|
| EP | 0 443 185 B1 | 8/1991 |
| EP | 0 454 516 A1 | 10/1991 |
| EP | 0 591 743 A1 | 4/1994 |
| EP | 0 513 801 B1 | 8/1995 |
| GB | 2 130 729 A | 6/1984 |
| GB | 2 248 692 A | 4/1992 |
| GB | 2 286 307 A | 8/1995 |
| WO | WO 98/34131 | 8/1998 |
| WO | WO 01/61371 A2 | 8/2001 |

* cited by examiner

DEVICE AND METHOD FOR THE ACTIVE MONITORING OF THE SAFETY PERIMETER OF A MOTOR VEHICLE

This application is a U.S. National Phase Application of PCT International Application PCT/ES2002/000364.

FIELD OF THE INVENTION

The invention refers to an active monitoring device suitable for the detection of moving objects or static obstacles within a safety perimeter of a motor vehicles whether this is in motion or not, with said device comprising one or more assemblies of at least two detectors, where in general, a first detector has a first detection angle and a first radius of action and a second detector has a second detection angle and a second radius of action, with said detectors transmitting input signals to at least one data processing device that generates output signals capable of activating some warning means the driver about a risk situation within a determined, clearly identified area or zone in said safety perimeter. It is intended that the device can also optionally provide additional information in the form of images displayed on a screen.

The invention also concerns an active monitoring method within a safety perimeter of a motor vehicle.

STATE OF THE TECHNIQUE

Safety devices of the type described at the beginning are well-known. They are usually employed to cover the blind angle in a side lane of a motor vehicle and to provide the driver with an alarm signal in the case of a dangerous situation.

A device of this type is described in document EP-A-591743.

Document WO01/61371 A2, from the same applicant, described some devices for the detection of objects, of the type that are mounted on motor vehicles and which are suitable for detecting an object situated in the blind angle. These devices comprise a detector with a receiver that can detect electromagnetic waves, with a focalising device and a photosensitive device that transforms the electromagnetic waves into electrical signals. An electronic circuit transforms the electrical signals into digital signals that are analysed by a logic circuit in order to analyse the presence of objects within the blind angle with a movement relative to the vehicle. The logic circuit emits variable output signals in function of the analysis results. The detection device includes indicating elements that are perceived by the driver. In general, two of said detection devices are included in the same vehicle, one on each side of the vehicle, for example, in each of the outside rear-view mirrors. In these cases, the two detection devices are substantially identical, with each one having the function of covering one side zone of the vehicle.

Frequently, these detection devices do not only cover the blind angle, but also a zone that is visible via the corresponding outside rear-view mirror. This is a positive feature because they perform a redundant monitoring function with respect to the non-permanent visual monitoring carried out by the driver, which in turn increases safety.

Patent EP-A-443185 describes a procedure and a device for assisting a motor vehicle driver during a lane change, which is based on the measurement of relevant data with respect to the traffic behind said vehicle and specifically in carrying out various successive measurements of distance with respect to other vehicles, determining the difference in accelerations between both vehicles in order to maintain a minimum safety distance, and using these data to produce assessment indices that are visually or acoustically indicated to the driver. In the production example shown in reference to FIG. 2 of the drawings, it shows the use of three distance measuring heads installed in the vehicle's rear-view mirrors and in the upper, central and rear sections of the vehicle, respectively, covering two lanes on the sides and one central behind the vehicle, controlling the signals coming from said measurement heads using time multiplexing.

Document EP-A-454516 describes a device for the display of obstacles in the vehicle's path, which makes use of two video cameras with CCD image sensors that are differentiated in function of the spectral field to which they are sensitive and with some means of differentially processing the two acquired video images in order to form a third image of the field open to the vehicle, containing only an image with enhanced contrast of the vehicle.

Document U.S. Pat. No. 5,424,952 describes the use of some detection means, including two optical systems, for the detection of objects situated in an area adjacent to a vehicle from two different points and in order to form images of said objects that are displayed on a screen. In the explained production, two image detectors are described, which include a pair of horizontally spaced optical systems operating jointly to form two images on which to use trigonometric principles to detect the distance to each object by deviation between the cited images.

Document U.S. Pat. No. 5,699,057 describes a warning system comprising a pair of stereoscopic cameras and some means of image recognition for their processing and the issuing of a warning signal to the user by some means of recognition of images of possible objects situated in an area adjacent to the vehicle.

However, none of said background documents describes the layout of two or more detectors in particular, cooperating together to cover, in a complementary fashion, two or more contiguous zones or with partial overlap, but that jointly cover a determined detection zone of a prefixed, blind angle, within a safety perimeter, enlarging the effective detection zone of said blind angle accessible to a single detector and where the two or more detectors take part equally in the generation of alarm signals for predetermined situations of the presence of objects in the specific covered monitored field.

Moreover, the detection devices in the current state of the technique usually have a quite limited radius of action, which reduces their effectiveness, particularly in the case of very long vehicles.

This document employs the expression "motor vehicle" to describe any type of vehicle, whether this is a saloon car, a bus, a lorry (articulated or not) and any type of special transport etc, including any of the previous type with a trailer.

A blind angle, according to the terminology employed in this invention, is an area of vision, adjacent to the motor vehicle, which cannot be directly seen by the driver under normal driving conditions. The rear-view mirrors, especially the outside ones, are intended to minimise these areas on the sides of the vehicles. The state of the technique recognises the use, particularly in very wide and/or long vehicles, of a larger number of mirrors, or mirrors with greater angles of curvature, in order to reduce the blind angles, as found in various directives. However, under normal driving conditions, the driver cannot be simultaneously watching or attending to several mirrors, which makes a device, such as the one proposed in this invention, an additional means of assistance that can prevent any maneuver, especially lane-changing, in a situation where there is another nearby vehicle with the potential risk of collision within what this invention defines as a safety perimeter.

A BRIEF DESCRIPTION OF THE INVENTION

According to the invention, it is proposed to cover said safety perimeter, by means of one or more detector assemblies, each one fitted with at least two detectors, applied to the coverage of, for example, each of the sides, together with the front and the rear of the vehicle. In general, each assembly comprises two detectors: a first detector with a first angle of detection and a first radius of action covering a first zone of detection that includes at least part of a blind angle of said vehicle, together with a second detector, with a second angle of detection and a second radius of action covering a second zone of detection, cooperating said first and at least a second detector to provide cover of a joint detection zone of said blind angle, which is enlarged with respect to that covered only by said first detector and which constitutes a sector of said safety perimeter. Said first and second detectors transmit input signals to at least one data processing device that generates output signals that are capable of activating the means to warn the driver of a dangerous situation in one of the monitored sectors and of optionally providing additional information in the form of images displayed on a screen.

The employed detectors are usually different and in particular, the first detection angle is larger than the second detection angle, with the first detector covering at least part of a blind angle of the motor vehicle and the second radius of action is greater than the first radius of action.

By having two different detectors of the cited type available, it becomes possible to combine two characteristics that would otherwise be incompatible: the detection angle and the radius of action. On the one hand, it is necessary to have the largest possible detection angle in order to better cover the blind angle. However, on the other hand, it is required to have the largest possible radius of action in order to be able to detect an approaching vehicle at a greater distance so that the corresponding alarm signal is issued while the driver still has sufficient time in which to react. However, if a detector's radius of action is to be increased it then becomes necessary to add a telephoto lens, which will reduce the detection angle. In this active monitoring device, in accordance with this invention, in a production example, there is a detector, the first detector, which has a wide detection angle and therefore satisfactorily covers the blind angle, while the other detector is given a large radius of action, for example, by adding a telephoto lens, or by locating it at a certain distance behind the first, which will enable the detection of approaching vehicles at a sufficiently large distance. In this way, the two detectors work together and the active monitoring device as a whole, complies with the two characteristics: that of large detection angle and radius of action. Preferably, the first and second detectors cover zones that partially overlap so that the detection and tracking of an approaching vehicle may be carried out in the joint detection zone without any solution of continuity. In this sense, it is also advantageous that both the first and second detectors are on the same side or in the same zone (front or rear) of the motor vehicle.

The invention also has the purpose of being an active monitoring device of the type described at the beginning and characterised in that the first and second detectors are oriented towards the same side lane adjacent to the motor vehicle and where the second detector is suitable for detecting a motor vehicle in the side lane at a distance from the active monitoring device carrying vehicle that is greater than the first detector.

In fact, in this way, it is also possible to make the requirements of wide detection angle and radius of action compatible. It is possible for the two detectors to be physically together or very close (for example, both housed in a body or support on the same outside rear-view mirror), but possessing different characteristics (detection angle and radius of action), or it is possible for them to have the same characteristics, but installed in different locations on the motor vehicle, which would enhance the overall characteristics of the active monitoring device. Therefore, for example, in the case of long motor vehicles, or those with trailers, the active monitoring device as a whole will have its radius of action notably enhanced by installing a second detector at the rear of the vehicle, even in the case of the second detector having the same characteristics as the first detector. Logically, it is also possible to combine both effects (a different location on the motor vehicle, together with different characteristics) in order to obtain an active monitoring device with a large radius of action and a wide detection angle.

In general, the data processing device of said at least two detectors operates by simultaneous, but separate processing of each of the inputs signals coming from the detectors, and the same said two detectors share the same warning means, for example, one or more warning lights or an acoustic alarm.

Another purpose of the invention is an active monitoring method that is applicable to any motor vehicle, in particular, saloon cars, lorries, buses, articulated vehicles (such as, for example, lorries consisting of a tractor and a trailer), and special transport, together with any of the previous ones that also include a trailer. In the latter case, it must be understood that the second and/or a possible fourth detector (which is described later) may be installed on any part of the vehicle (the front part or the trailer). In a more general sense, it may be considered that a motor vehicle, as this expression has been employed in this document, includes any assembly of elements that are pulled together along a street or highway.

BRIEF DESCRIPTION OF THE DRAWINGS

Other advantages and characteristics of the invention can be appreciated from the following description in which, without having any limiting character, describes certain preferential construction modes of the invention, with reference to the accompanying drawings. The figures show.

DETAILED DESCRIPTION OF SOME FORMS OF CONSTRUCTION THE INVENTION

Figure 1:
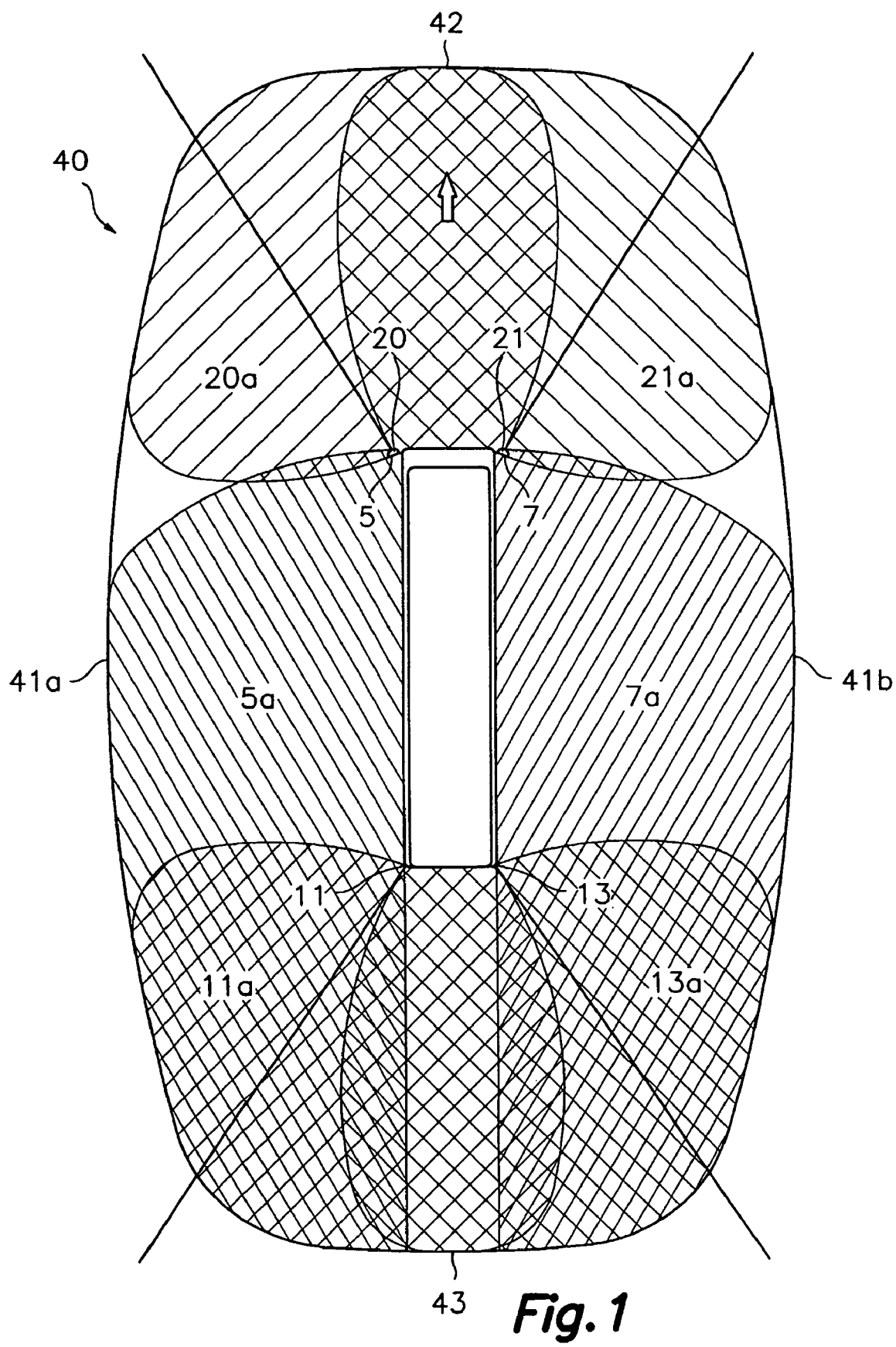
FIG. 1 is a schematic plan view of a saloon car indicating a series of areas existing within a safety perimeter surrounding said automobile.

Preferably, the active monitoring device detectors will capture images which, in most cases, are processed separately and simultaneously. The processing operation is advantageously carried out by a data processing device adjacent to each detector and said data processing device generates output signals that are sent to an interface inside the vehicle, which receives the output signals from the various data processing devices and activates the warning devices and optionally, information devices. It is also possible to transmit all or part of the captured image inside the car so that it can be viewed directly by the driver, however, it is preferred that only said output signals are sent as visual or acoustic warnings, since this will simplify the active monitoring device, make it more economic, faster and provide the driver with an immediately intelligible signal, even in poor visibility conditions (darkness, rain, fog and dazzling situations etc), without interfering with said driver's attention.

Preferably, the first detector is built into the body or support structure of an outside rear-view mirror on the motor vehicle. In this position, it can provide optimum coverage of the blind angle. Advantageously, the second detector is installed at the rear or one side of the motor vehicle, more rear than the first detector. In this way, the second detector, which is intended to mainly detect objects at a greater distance, will gain a distance equivalent to the length of the motor vehicle with respect to the first detector. This is particularly important in the case of long motor vehicles, such as buses and lorries, with or without trailers (for example, twenty metres) since this means a significant part of the radius of action of the first detector, which could be, for example, thirty metres. In such cases, it may be advantageous that the second detector is not installed at the rear of the vehicle, but instead, at an intermediate point of the same. The invention also contemplates the use of three or more detectors cooperating together to cover a given area of the safety perimeter and, in general, a blind angle and an extension of the detected zone of said blind angle.

Usually, the first and second detectors are installed so that they both cover the same side of the motor vehicle. For this reason, it would be advantageous to add a third detector and optionally a fourth, which would cover the other side of the motor vehicle. Preferably, the third detector is, once again, a detector with a wide detection angle and preferably installed on the second outside rear-view mirror on the motor vehicle. The fourth detector is preferably a detector with a large radius of action which, preferably is installed at the rear of the motor vehicle. Thus, said third and fourth detectors function in the same way as the first and second detectors, with the only difference being that they are installed on the opposite side of the vehicle.

The detectors with wide angles of detection usually have a radius of action between twenty and thirty metres, whereas detectors with greater radii of action normally include a telephoto lens and their radii of action is normally between approximately forty and fifty metres.

As has already been said, the combination of a first detector and at least one second detector cover the same side of the motor vehicle. I n this construction, it is advantageous for said combination of at least two detectors provides a single warning signal to the driver, in the sense that the first and second detectors provide combined information that indicates the danger status on said side of the motor vehicle. This is achieved by arranging for the first and second detectors to share the same warning devices. Preferably, the warning devices receive a first combined signal that is the result of applying the "OR" logic function to the outputs signals corresponding to the first and second detectors. Thus, if neither of the two output signals corresponds to a determined alarm level, then the first combined signal will not be able to activate the corresponding warning device, but if either or both of the two output signals correspond to a determined alarm level, the first combined signal will activate the corresponding warning device. All this is also applicable to the third and fourth detectors, in other words, the second pair of detectors that covers the other side of the vehicle, so that the corresponding warning devices that make up a second group of warning devices, receive a second combined signal obtained in a similar fashion.

In a situation where the second detector also carries out the functions of the fourth detector, as previously described, the second detector will share the first warning devices with the first detector, and it will also share the second warning devices with the third detector. Preferably, the second detector is capable of discerning whether the danger status corresponds to one ort other sides of the vehicle, so that the corresponding signal is sent to the first or second warning devices, as applicable.

Preferably, the first, second, third and/or fourth detectors are optical cameras that are suitable for operation within the visible light and/or infrared spectrum, such as, for example, those described in the cited document WO 01/61371 A2. However, any other type of detector would also be possible, in particular a magnetic detector as detailed in a construction example described later.

Preferably, each of the detectors is connected to its corresponding data processing device, forming part of a single integrated circuit or via a support or connection printed circuit (for example, a flexible circuit).

In fact, in this way, communications between the detector and the data processing device may be established directly, without any requirements for wiring, which will improve the data transfer speed and facilitate compliance with electro-magnetic compliance requirements (EMC). This will additionally involve cost benefits.

The second detector and, where applicable, the fourth detector, will preferably have a large radius of action. This is particularly advantageous for the detection of approaching vehicles at long distances. In the case of highway driving, at high speeds, this long-range detection will enable the alarm signal to be generated with sufficient time for suitable driver reaction. However, under other driving conditions, for example, town driving, the large radius of action could produce false or unnecessary alarm signals. For this reason, it would be advantageous that, under slow speed driving conditions that are typical of town driving, the large radius-of-action detectors are not operational. One preferential method of constructing the invention would therefore consist of the second detector and, where applicable, the fourth detector only being operational above a minimum speed of the vehicle on which they are installed. This minimum speed may be defined according to various criteria, which could be, for example, 50 kilometres per hour, which is the built-up area speed limit. Another possible value would be, for example, 70 kilometres per hour. Alternatively, instead of the second and/or the fourth detectors being operational or not in function of speed, it is possible to simply ignore the output signals they generate. In this way, it is not necessary for the detectors to be able to receive an "external" signal (coming from the vehicle), something that would both simplify and reduce the costs of construction.

Another preferential form of construction is obtained by fitting some of said detectors with a module that detects vehicles without any relative speed. One example of a module for the detection of vehicles without any relative speed is described in the cited document WO 01/61371 A2. Said module, once it has identified an approaching vehicle, would estimate and monitor its speed and, if it detects that the approaching vehicle speed is the same as that of the vehicle carrying the active monitoring device (with a preset ± tolerance margin) will emit a specific signal until there is a change in the detected situation. This module for the detection of vehicles without any relative speed may be installed in both the first and third detectors or only in the first, for example, in the case where the vehicle is not fitted with a third detector.

FIG. 1 shows a saloon car in which certain differentiated areas are indicated within a safety perimeter:
  side areas 41a and 41b, which cover a zone visible to the driver either directly or via auxiliary mirrors and a part of the blind angle;
  a frontal area 42, in front of the vehicle, including a blind angle zone; and
  a rear area 43, behind the vehicle, including a blind angle zone.

The cited side areas 41a and 41b are covered by means of a group of at least two detectors 5, 11; 7, 13, which cover areas 5a, 11a, and 7a, 13a, which overlap and complement each other in order to cover a blind side angle.

The front area 42 is covered by a group of two detectors 20, 21 that cover areas 20a, 21a respectively, with partial overlap.

The rear area 43 is covered by part of the cited areas 11a and 13a.

The objective of the invention is, through the use of groups of at least two detectors in cooperation to cover a joint detection area or zone, to make said safety perimeter 40 as large as possible, by suitably combining the detection angle and radius of action of the employed detectors and their positions.

Figure 2:
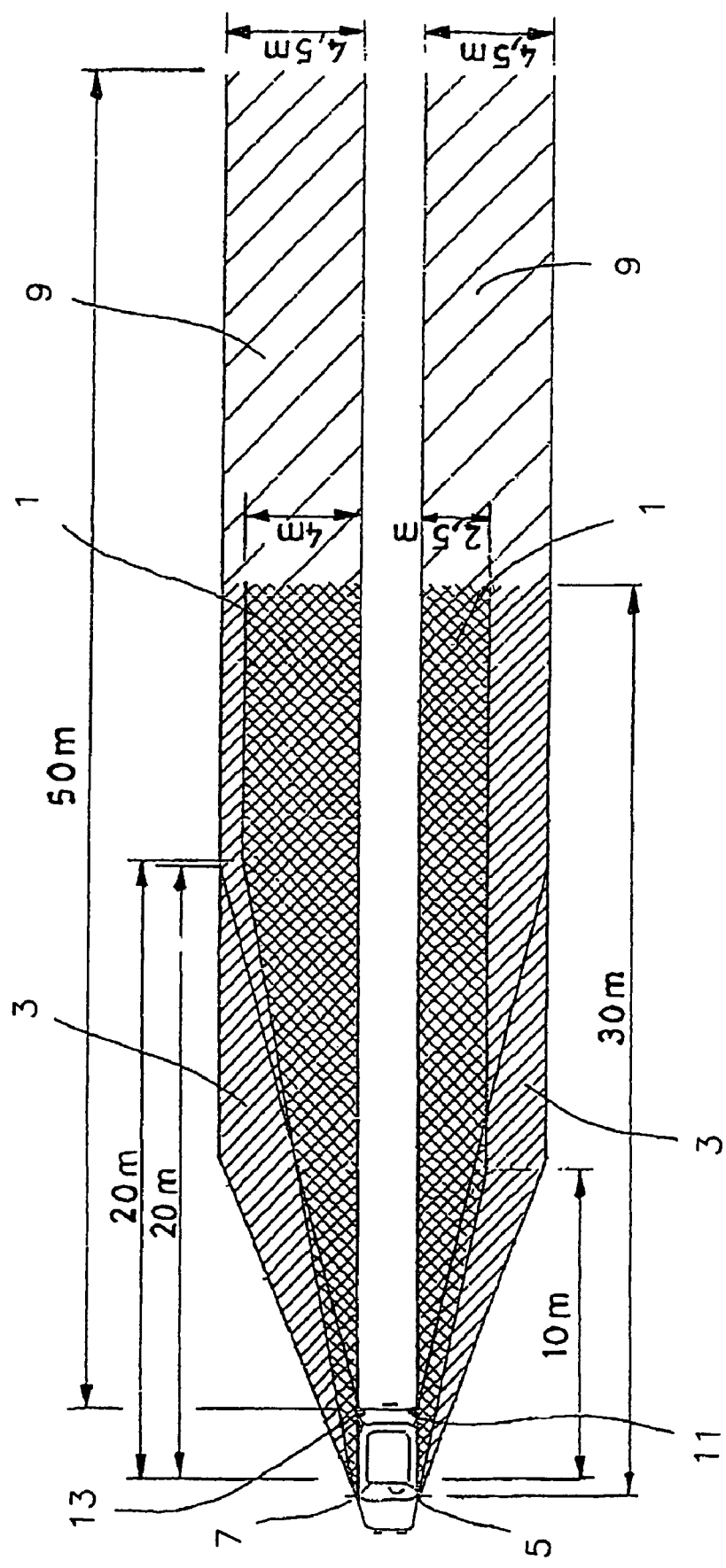
FIG. 2 is a schematic view of a saloon car with an active monitoring device in accordance with the invention, showing the zones of vision via the rear-view mirrors and of detection that are covered by various cooperating detectors.

FIG. 2 shows a saloon car in which the following areas have been indicated:
  first areas 1, marked with double hatching, which correspond to the areas visible using the outside rear-view mirrors. On the driver's side, this first area 1 has a width of 2.5 metres at a distance of ten metres from the rear-view mirror. On the passenger's side, the first area 1 has a width of four metres at a distance of twenty metres from the rear-view mirror.
  second areas 3, marked by single hatching, which correspond to the areas detected by a first detector 5, installed on the driver's side rear-view mirror, and by a third detector 7, installed on the passenger's side rear-view mirror. Both second areas 3 have a width of 4.5 metres at approximately ten metres distance from corresponding detector 5, 7, in other words from the corresponding rear-view mirror. The length of these second areas 3 is approximately 30 metres.
  third areas 9, marked by wider-spaced single hatching, which correspond to the areas detected by a second detector 11, installed, in this example, at the far rear left of the saloon car and by a fourth detector 13, installed here at the far rear right of the saloon car. These third areas 9 have a narrower detection angle than the second areas 3, but they are some fifty metres long.

Second areas 3 and third areas 9 partially overlap, so that the active monitoring device has full view, without a continuity solution, up to some fifty metres away.

Figure 3:
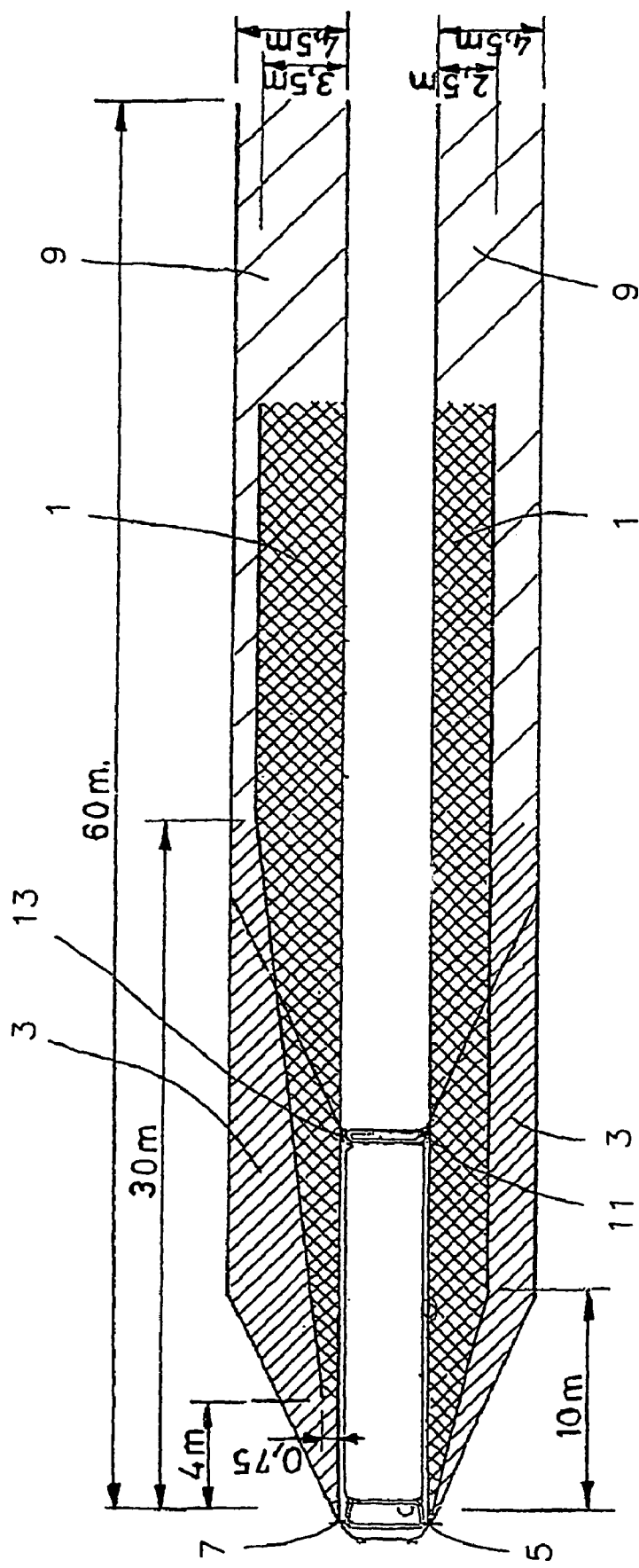
FIG. 3 is a schematic view of a bus with an active monitoring device in accordance with the invention.

FIG. 3 shows a bus in which the following areas have been represented in a similar fashion to FIG. 1:
  first areas 1, marked with double hatching, which correspond to the areas visible using the outside rear-view mirrors. On the driver's side, this first area 1 has a width of 2.5 metres at a distance of ten metres from the rear-view mirror. On the passenger's side, the first area 1 has a width of 3.5 metres at 30 metres distance from the rear-view mirror and a width of 0.75 metres at 4 metres distance from the rear-view mirror.
  second areas 3, marked by single hatching, which correspond to the areas detected by a first detector 5, installed on the driver's side rear-view mirror, and by a third detector 7, installed on the passenger's side rear-view mirror. Both second areas 3 have a width of 4.5 metres at approximately ten metres distance from corresponding detector 5, 7, in other words from the corresponding rear-view mirror. The length of these second areas 3 is approximately 30 metres.
  third areas 9, marked by wider-spaced single hatching, which correspond to the areas detected by a second detector 11, installed at the far rear left of the bus and by a fourth detector 13, installed here at the far rear right of the bus. These third areas 9 also partially overlap with the second area 3 and, once again, extend beyond the limits of the second areas 3, so that the active monitoring device as a whole has a total radius of action of some sixty metres.

Figure 4:
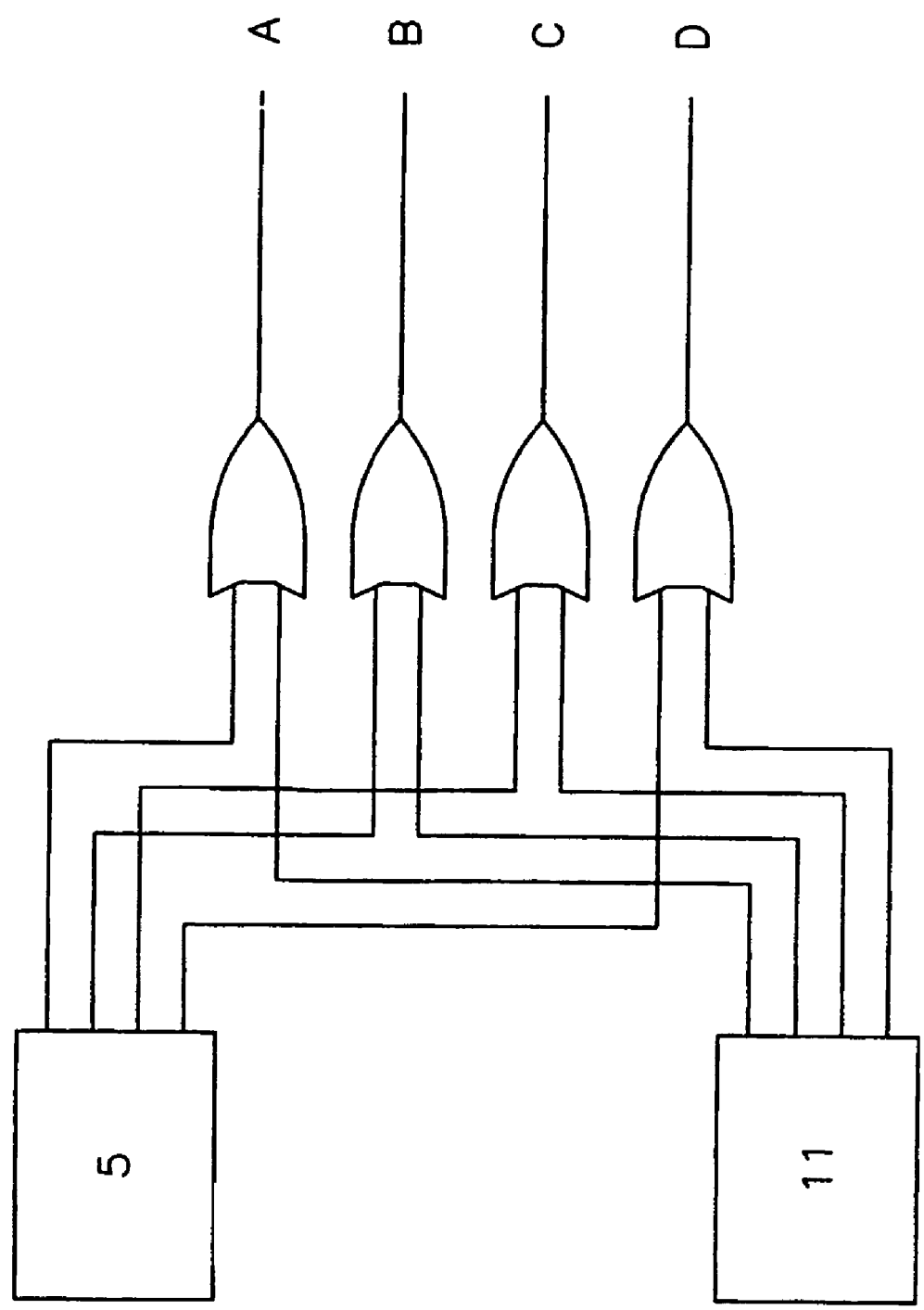
FIG. 4 is a logic diagram of one possible treatment method for the output signals from each detector after processing.

FIG. 4 is an example of the logic connections for the output signals coming from the group of detectors that cover the same side lane (in other words, the first detector 5 and the second detector 11 or the third detector 7 and the fourth detector 13). Each detector (in fact, the associated data processing device) generates output signals (that may be one or more). For example, FIG. 3 assumes that four output signals A, B, C, D, are generated, three for activating three different coloured indicator lamps (red, yellow and green) and one for activating the acoustic warning. Each front detector output signal (the first detector 5 or the third detector 7) is connected to one input of a logic "OR" gate and each corresponding rear detector output signal (the second detector 11 or the fourth detector 13) is connected to the other input of the corresponding logic "OR" gate. In this way, each warning device (red, yellow or green indicator lamps or the acoustic warning) will be activated whether only one of the two detectors on the corresponding side generates a warning output signal or both simultaneously.

Figure 5:
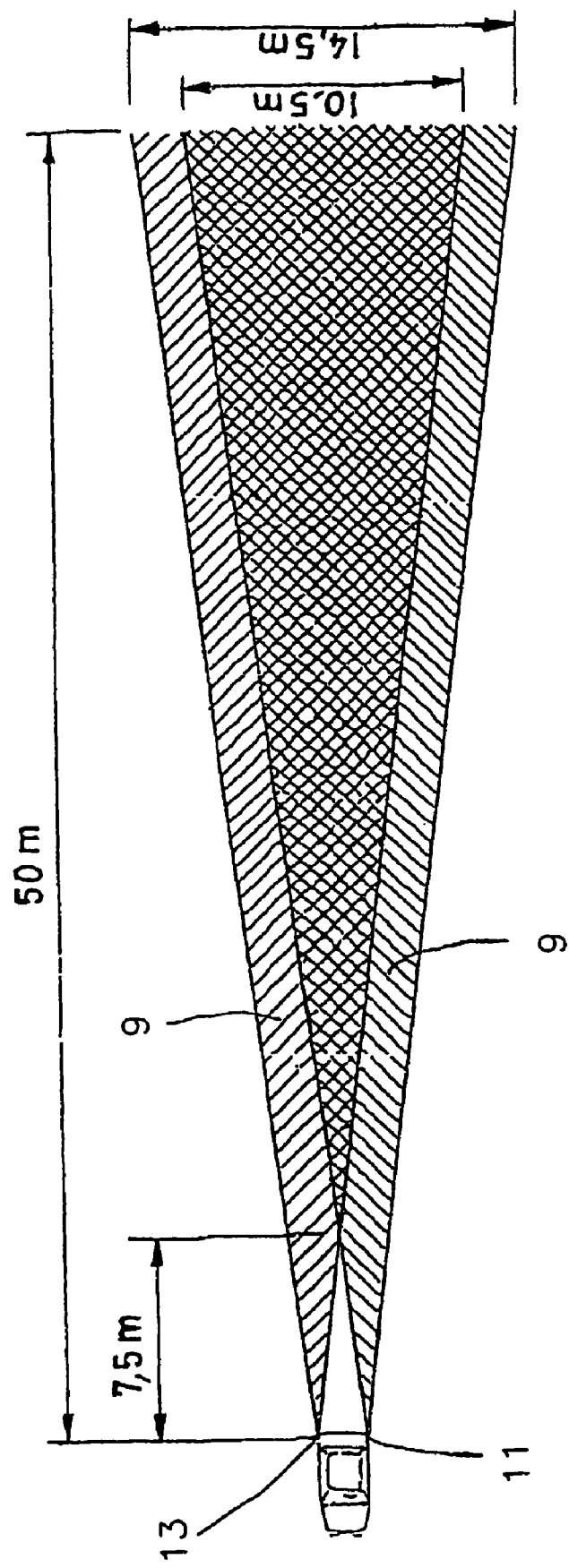
FIG. 5 is a schematic view of an automobile with another active monitoring device in accordance with a variant of execution of the invention.

FIG. 5 shows another preferential form of utilising the invention. In this case, the second detector 11 and the fourth detector 13 present detection areas 9 that at least partially overlap. In this way, the active monitoring device can employ stereographic vision techniques to determine the distance and relative speed of objects detected in said detection areas 9. This requires that a calculation device receives the images captured (either just as acquired or suitably processed, for example, to minimise the flow of information that has to be transmitted) by both detectors 7, 13. This calculation device may be independent from the data processing devices for each of the detectors 7, 13. However, it is possible for one of the data processing devices (which are usually microprocessors) to also perform the functions of calculation device. It is also possible for both detectors to be connected to a single device that carries out the functions of the two data processing devices as well as those of the calculation device.

Figure 6:
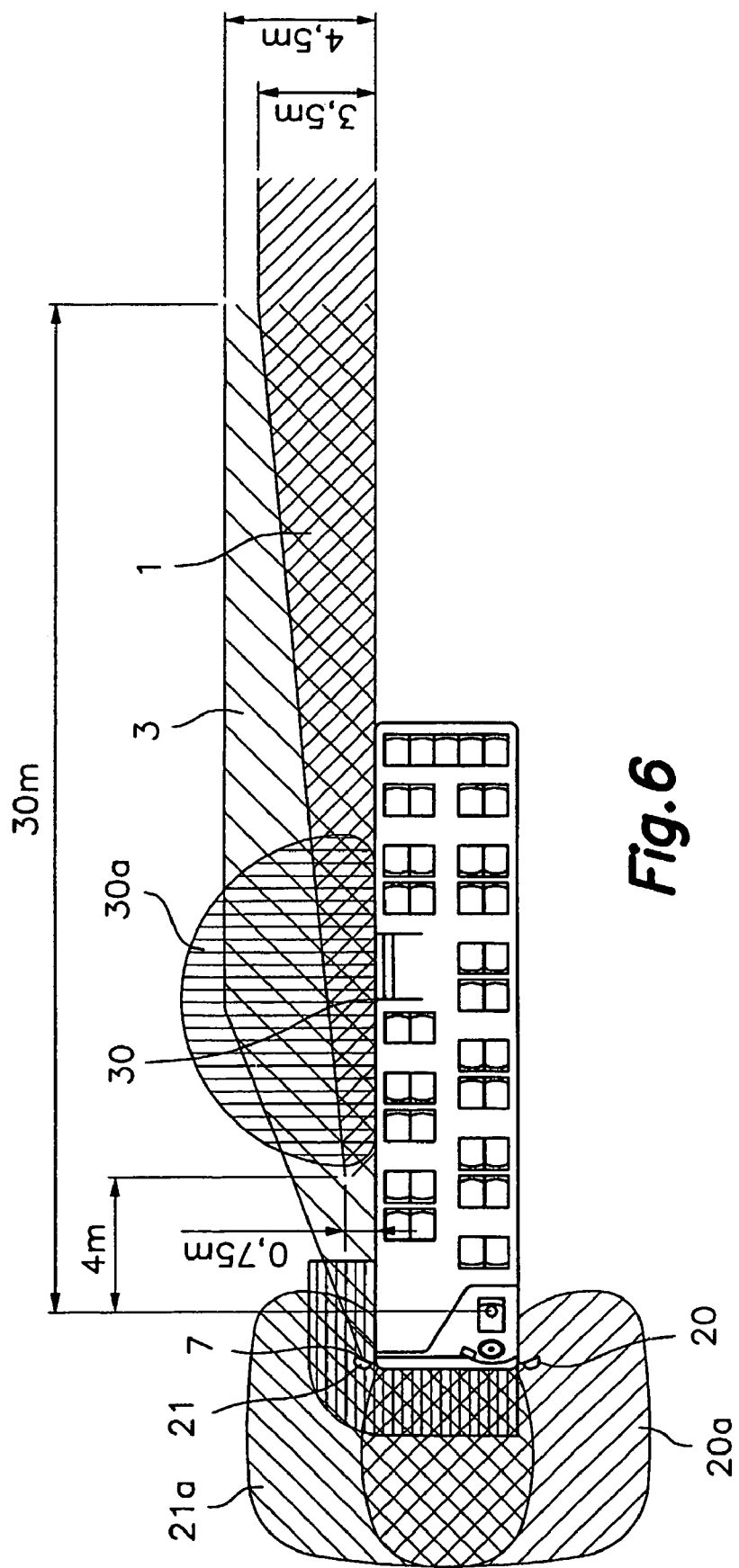
FIG. 6 is a schematic view of a coach or lorry with an active monitoring device intended to cover a front blind angle, which is implemented in accordance with the invention's principles.

FIG. 6 illustrates one preferential way of use on a bus or lorry, where two cameras 20, 21 are focussed towards the front of the vehicle, with a first camera covering a zone 30 that includes a front blind angle and a second camera 21 positioned on the opposite front section, partly covering said blind angle zone 30 and extending towards an opposite side zone 31 of the vehicle. Both cameras 20, 21 will be able to detect moving objects. Therefore, in the case of, for example, a moving child, animal or object being in front of the vehicle and is not visible to the driver, the device will detect it and sound the alarm. This alarm signal may be connected to the vehicle's ignition system so that it cannot be started until the driver has verified the situation. FIG. 6 also represents a detector 7 (like the cited third detector) associated with one of the vehicles side mirrors to cover an area 3, and the visible area 1 has been indicated on said side.

The front cameras 20, 21 present a detection area that at least partially overlaps, and in this zone, when the vehicle is parked, stereoscopic techniques may be employed to determine the height of an object. The device will determine the height of the object so that if this exceeds a certain limit, an alarm signal is generated, which can subsequently be used to prevent the vehicle from. There will be a deactivation protocol for this alarm signal so that once the situation has been checked by the driver it will be possible to start the vehicle.

Similarly, in function of whether the vehicle is parked or moving, the cameras can have a different function. Thus, in the case of the front cameras, when the vehicle is parked (and, for example, by inserting and turning the ignition key to a specific position), said cameras will perform the function of detecting moving objects or obstacles with a height exceeding a determined value, whereas, when the vehicle is moving at a higher speed, the cameras have a different function, such as that of following the lines along the roadway as described in referred application WO 01/61371 A2.

The bus shown in FIG. 6 will also preferably include a group of at least two cameras, such as those described in FIG. 3, on one or both sides.

The cameras may also have a different use in function of the vehicle's speed by entering the speed into a control system for said cameras, each one switching to a different program routine in function of the vehicle's speed value and the camera position.

Another possibility of applying the invention's principles consists of using a group of two or more cameras at the rear of the vehicle, with a first camera focussed towards the rear blind angle and a second camera to a zone of this blind angle that extends to one of the sides. Detection of movement and also of obstacles will be carried out in this rear zone, together with the distances to them. These rear cameras will be operational with respect to these functions only when the vehicle is parked and will generate an alarm when reverse gear is engaged or when the vehicle begins to move backwards. This will also require the input of the vehicle's speed and reverse gear signals into the control system for said cameras. Within a range of forward speeds, for example, between five and sixty kilometres per hour, these rear cameras will be non-operational. In the case of the vehicle moving at a positive speed (forwards) and above a certain threshold (for example, sixty kilometres per hour), the cited rear cameras will have the function of being a second detector for vehicles at long distances, operating in combination with the front cameras (cited first and third detectors 5, 7). Thus, in this case, the rear cameras will have a different function depending on the vehicle's speed and the position of said cameras.

The invention also contemplates the use of magnetic sensors as detectors, such as those described in Spanish patent application 200101105 from the same applicant, for detecting (approximately six metres range) the presence of objects in a blind angle of the vehicle, where said objects contain at least one ferromagnetic material in such a way that it would cause distortion of the earth's magnetic field, together with the installation of a logic circuit with neural networks for processing the signals coming from the sensors, in other words, a processor or neural network that can be identical to the one employed for processing the signals from the cameras.

In particular and in accordance with the invention, it is intended that, for example, said second and fourth detectors 11, 13 described in the examples of FIGS. 2 and 3 consist of the means to detect a distortion in the earth's magnetic field, and being suitable to detect at least two of the three spatial components of the magnetic field.

In a preferred construction, said second and fourth detectors 11, 13 comprise a magnetic field sensor, prepared to detect at least two of the three spatial components in a magnetic field and able to generate electrical signals in function of the detected magnetic field, and said sensors are installed symmetrically with respect to the vehicle's longitudinal axis, and are connected to an electronic circuit that calculates the difference of the signals generated by each of said sensors. The preferred configurations would be a combination of camera and magnetic sensor at the front of the vehicle (one on each side of the vehicle), together with cameras on the outside rear-view mirrors and magnetic sensors at the rear of the vehicle, one on each side in order to obtain better coverage.

In addition to low cost, the use of magnetic sensors has the advantage of being able to detect vehicles under low-light conditions (dazzling and fog etc), in other words, it takes advantage of the insensitivity of such detectors to weather conditions.

The method proposed by the invention for active monitoring within a safety perimeter for a motor vehicle for the purpose of detecting moving objects and static obstacles in an area of risk, close to said vehicle, consists of the following basic stages:

the acquisition of information from at least two differentiated detection zones within said safety perimeter, by means of a group comprising a first detector 5, 20 that covers a first zone and at least one second detector 11, 21 that covers a second zone, either contiguous or partly superposed on said first zone and extending it, with both detectors cooperating to define a combined detection zone that includes a sector of said safety perimeter, processing of the signals acquired by at least two detectors 5, 20, 11, 21, and the generation of warning signals in the case of detecting an object that could involve a risk or due to the presence of an insurmountable obstacle existing in one of the joint detection zones, applying a "OR" logic function to said processed signals, corresponding to said first detector 5, 20 and to said second detector 11, 21.

According to a preferred method of construction, the processing of the detector signals consists of a separate, simultaneous treatment of the input signals provided by said first 5, 20 and second detectors 11, 21.

Additionally, in function of the position occupied by each of said groups of detectors 5, 20; 11, 21 on the vehicle, a differentiated processing is intended for the data captured by each detector.

In a similar fashion, in function of the vehicle's speed, each of the cited detectors 5, 20; 11, 21 can be activated or not, be ignored or perform a differential processing of the captured data.

In order to implement the method in the most efficient way, it is intended to use several groups of detectors, each consisting of a first and at least one second detector applied to cover several sectors of said safety perimeter, with the detectors of each group sharing the same warning means, specific to each group.

The various components of the active monitoring device can be interconnected in various manners. It is possible to communicate the detectors with a central processor via a specific communications network. The central processor can receive the images just as they are captured, pre-processed and/or compressed or the output signals of treatment by the previously described data processing devices. The central processor may be located anywhere and any communications protocols may also be employed. In particular, these can be of the Firewire, BlueTooth, MOST, USB2 types or others which, because of their transmission speeds and bandwidth permit the transmission of a large amount of data at speeds that allow real-time data processing. In this case, the central processor is responsible for decoding the compressed data coming from each detector and/or processing the information that has to be presented to the driver. The central processor and/or each of the detectors can receive extra data over the vehicles communications network (or networks), which will enhance the response of the active monitoring device, with respect to the various driving conditions, reducing the number of false alarms. Possible parameters that could be received over the vehicle's communications network are the vehicle speed, data from the vehicle steering and inclination sensors and signals from the left and right indicators etc.

By having data from the vehicle steering and inclination sensors and about its speed, it becomes possible for the detectors to adapt their functions, in particular, the detection zone depending on these parameters.

It is also possible for the interconnection between at least some of the cited groups of at least two detectors 5, 11; 20, 21; 7; 13 that the means of processing their input signals and the cited warning means is carried out by radiofrequency communications.

Alternatively, one of the data processing devices can carry out the functions of central processor, together with its own functions, in which case, the data processing device will be additionally connected to the vehicle communications network (or networks). Or, the central processor could perform the functions of all the data processing devices together with its own functions.

It is also possible that the communications between detectors do not occur over a specific network, but instead, it makes use of the vehicle's communications network (or one of its networks).

Finally, it is possible that there are no communications between the detectors, instead they limit themselves to transmitting their output signals (via their corresponding data processing devices), without receiving any data from the rest of the vehicle or the other detectors. Only the central processor received data from the vehicle and subsequently transmits data to the vehicle.

The invention claimed is:

1. An active monitoring device within a safety perimeter of a motor vehicle, for the detection of moving objects or static obstacles within said safety perimeter, comprising:
   a first detector which has a first detection angle and a first radius of action, which covers a first detection zone that includes at least part of a blind angle of said vehicle, where said first detector transmits input signals to at least one data processing device that generates output signals suitable to activate warning means for the driver;
   at least a second detector, which has a second detection angle and a second radius of action, which covers a second detection zone and forms, with said first detector, a group, with said first and at least one second detectors cooperate in order to cover a combined detection zone of said blind angle, which is enlarged with respect to that covered by the first detector and which forms a sector of said safety perimeter;
   said first and at least one second detectors of said group share the same warning means that can be activated via the processing of the output signals from each one; and
   at least one of said detectors is an optical camera capable of operation in the visible and/or infrared spectra,
   wherein each of the cited detectors can be activated or not or perform differential processing on the captured information as a function of the vehicle's speed.

2. A device in accordance with claim 1, wherein said first detector is oriented towards a side lane adjacent to said motor vehicle and said at least one second detector of said group, is oriented, at least partly, towards said same side lane and the area covered by said second detector extends towards the rear of the vehicle.

3. A device in accordance with claim 2, wherein said at least one data processing device operates by processing simultaneously and separately, each of said input signals.

4. An active monitoring device within a safety perimeter of a motor vehicle, for the detection of moving objects or static obstacles within said safety perimeter, comprising:
   a first detector which has a first detection angle and a first radius of action, which covers a first detection zone that includes at least part of a blind angle of said vehicle, where said first detector transmits input signals to at least one data processing device that generates output signals suitable to activate warning means for the driver;
   at least a second detector, which has a second detection angle and a second radius of action, which covers a second detection zone and forms, with said first detector, a group, with said first and at least one second detectors cooperate in order to cover a combined detection zone of said blind angle, which is enlarged with respect to that covered by the first detector and which forms a sector of said safety perimeter;
   said first and at least one second detectors of said group share the same warning means that can be activated via the processing of the output signals from each one; and
   at least one of said detectors is an optical camera capable of operation in the visible and/or infrared spectra,
   wherein said first detector, of said group, covers a blind angle that extends in front of the vehicle and extends towards a first side zone and said at least one second detector covers an area that extends to the front of the vehicle towards a second zone located on the opposite side of the vehicle.

5. An active monitoring device within a safety perimeter of a motor vehicle, for the detection of moving objects or static obstacles within said safety perimeter, comprising:

a first detector which has a first detection angle and a first radius of action, which covers a first detection zone that includes at least cart of a blind angle of said vehicle, where said first detector transmits input signals to at least one data processing device that generates output signals suitable to activate warning means for the driver;

at least a second detector, which has a second detection angle and a second radius of action, which covers a second detection zone and forms, with said first detector, a group, with said first and at least one second detectors cooperate in order to cover a combined detection zone of said blind angle, which is enlarged with respect to that covered by the first detector and which forms a sector of said safety perimeter;

said first and at least one second detectors of said group share the same warning means that can be activated via the processing of the output signals from each one; and at least one of said detectors is an optical camera capable of operation in the visible and/or infrared spectra, wherein said first detector of said group covers a blind angle that extends in front of the vehicle and extends towards a first side zone and said second detector covers a zone that extends to the rear making longer a second side zone opposite said first side zone.

6. An active monitoring device within a safety perimeter of a motor vehicle, for the detection of moving objects or static obstacles within said safety perimeter, comprising:

a first detector which has a first detection angle and a first radius of action, which covers a first detection zone that includes at least part of a blind angle of said vehicle, where said first detector transmits input signals to at least one data processing device that generates output signals suitable to activate warning means for the driver;

at least a second detector, which has a second detection angle and a second radius of action, which covers a second detection zone and forms, with said first detector, a group, with said first and at least one second detectors cooperate in order to cover a combined detection zone of said blind angle, which is enlarged with respect to that covered by the first detector and which forms a sector of said safety perimeter;

said first and at least one second detectors of said group share the same warning means that can be activated via the processing of the output signals from each one; and at least one of said detectors is an optical camera capable of operation in the visible and/or infrared spectra, wherein in addition to a first group having said first and at least one second detector, oriented towards a side lane adjacent to the vehicle, further comprising a second group having first and second detectors, where said first detector covers a blind angle that extends in front of the vehicle and extends towards a first side zone and said second detector covers an area that extends in front of the vehicle towards a second zone located on the opposite side of the vehicle.

7. An active monitoring device within a safety perimeter of a motor vehicle, for the detection of moving objects or static obstacles within said safety perimeter, comprising:

a first detector which has a first detection angle and a first radius of action, which covers a first detection zone that includes at least part of a blind angle of said vehicle, where said first detector transmits input signals to at least one data processing device that generates output signals suitable to activate warning means for the driver;

at least a second detector, which has a second detection angle and a second radius of action, which covers a second detection zone and forms, with said first detector, a group, with said first and at least one second detectors cooperate in order to cover a combined detection zone of said blind angle, which is enlarged with respect to that covered by the first detector and which forms a sector of said safety perimeter;

said first and at least one second detectors of said group share the same warning means that can be activated via the processing of the output signals from each one; and at least one of said detectors is an optical camera capable of operation in the visible and/or infrared spectra, wherein in addition to a first group having said first and at least one second detector on one side of the vehicle comprises a second group having first and second detectors, where a first detector of the second group covers a blind angle that extends in front of the vehicle and extends towards a first side zone and a second detector of said second group coincides with the first detector of the first group.

8. An active monitoring device within a safety perimeter of a motor vehicle, for the detection of moving objects or static obstacles within said safety perimeter, comprising:

a first detector which has a first detection angle and a first radius of action, which covers a first detection zone that includes at least part of a blind angle of said vehicle, where said first detector transmits input signals to at least one data processing device that generates output signals suitable to activate warning means for the driver;

at least a second detector, which has a second detection angle and a second radius of action, which covers a second detection zone and forms, with said first detector, a group, with said first and at least one second detectors cooperate in order to cover a combined detection zone of said blind angle, which is enlarged with respect to that covered by the first detector and which forms a sector of said safety perimeter;

said first and at least one second detectors of said group share the same warning means that can be activated via the processing of the output signals from each one; and at least one of said detectors is an optical camera capable of operation in the visible and/or infrared spectra, wherein said first detection angle is wider than said second angle and in that said second radius of action is larger than said first radius of action.

9. An active monitoring device within a safety perimeter of a motor vehicle, for the detection of moving objects or static obstacles within said safety perimeter, comprising:

a first detector which has a first detection angle and a first radius of action, which covers a first detection zone that includes at least part of a blind angle of said vehicle, where said first detector transmits input signals to at least one data processing device that generates output signals suitable to activate warning means for the driver;

at least a second detector, which has a second detection angle and a second radius of action, which covers a second detection zone and forms, with said first detector, a group, with said first and at least one second detectors cooperate in order to cover a combined detection zone of said blind angle, which is enlarged with respect to that covered by the first detector and which forms a sector of said safety perimeter;

said first and at least one second detectors of said group share the same warning means that can be activated via the processing of the output signals from each one; and at least one of said detectors is an optical camera capable of operation in the visible and/or infrared spectra, wherein the position of said second detector in the vehicle is such that it can detect a vehicle in said side lane at a distance from said motor vehicle that is greater than the radius of action of said first detector and in that it is intended to employ differential processing of the data captured by said first and second detectors as a function of their positions on the vehicle.

10. An active monitoring device within a safety perimeter of a motor vehicle, for the detection of moving objects or static obstacles within said safety perimeter, comprising:

a first detector which has a first detection angle and a first radius of action, which covers a first detection zone that includes at least part of a blind angle of said vehicle, where said first detector transmits input signals to at least one data processing device that generates output signals suitable to activate warning means for the driver;

at least a second detector, which has a second detection angle and a second radius of action, which covers a second detection zone and forms, with said first detector, a group, with said first and at least one second detectors cooperate in order to cover a combined detection zone of said blind angle, which is enlarged with respect to that covered by the first detector and which forms a sector of said safety perimeter;

said first and at least one second detectors of said group share the same warning means that can be activated via the processing of the output signals from each one; and at least one of said detectors is an optical camera capable of operation in the visible and/or infrared spectra; and a third detector oriented towards a lane adjacent to said motor vehicle, which covers a detection zone that includes at least part of a blind angle of said vehicle, with said third detector being placed on a side of the vehicle opposite that of said first detector.

11. A device in accordance with claim 10, further comprising a fourth detector installed at the rear of said motor vehicle, or on a side zone, more rear than the cited third detector, on a side of the vehicle opposite that covered by said first detector and in that said third and fourth detectors cooperate to cover a first zone of an adjacent lane and a second zone that extends to the rear of the vehicle, operating as one of said groups having first and second detectors.

12. A device in accordance with claim 4, comprising two groups of a first and second detectors on opposite sides of the vehicle.

13. An active monitoring device within a safety perimeter of a motor vehicle, for the detection of moving objects or static obstacles within said safety perimeter, comprising:

a first detector which has a first detection angle and a first radius of action, which covers a first detection zone that includes at least part of a blind angle of said vehicle, where said first detector transmits input signals to at least one data processing device that generates output signals suitable to activate warning means for the driver;

at least a second detector, which has a second detection angle and a second radius of action, which covers a second detection zone and forms, with said first detector, a group, with said first and at least one second detectors cooperate in order to cover a combined detection zone of said blind angle, which is enlarged with respect to that covered by the first detector and which forms a sector of said safety perimeter;

said first and at least one second detectors of said group share the same warning means that can be activated via the processing of the output signals from each one; and at least one of said detectors is an optical camera capable of operation in the visible and/or infrared spectra, wherein said first detector is installed in the body or structure of an outside rear-view mirror on said motor vehicle.

14. A device in accordance with claim 13, wherein said second detector is installed at the rear of said motor vehicle or in a side zone, more rear than the cited first detector.

15. A device in accordance with claim 3, wherein said group having a first and at least one second detector is installed in the body or structure of an outside rear-view mirror on said motor vehicle.

16. A device in accordance with claim 1, wherein said warning means receives a first combined signal, where said first combined signal is obtained by applying a "OR" logic function between said processed output signals corresponding to the first and second detector, of each group having one first and at least one second detector.

17. A device in accordance with claim 11, wherein said third and fourth detectors share the same warning means.

18. A device in accordance with claim 17, wherein said warning means receives a second combined signal, where said second combined signal is obtained by applying a "OR" logic function between said processed output.

19. A device in accordance with claim 1, wherein each of said detectors of said groups having at least two detectors that cooperate to cover a combined detection zone are directly connected to a corresponding data processing device, forming part of a single integrated circuit or connected to said processor via a support or connection printed circuit.

20. A device in accordance with claim 11, wherein said second and fourth detectors comprise detection means for detecting the distortion of the earth's magnetic field and suitable for the detection of at least two of the three spatial components of a magnetic field.

21. A device in accordance with claim 11, wherein said second and fourth detectors are made up of a magnetic field sensor capable of generating electrical signals as a function of said magnetic field, and prepared to detect at least two of the three spatial components of a magnetic field and in that said sensors are installed symmetrically with respect to the vehicle's longitudinal axis, and are connected to an electronic circuit that calculates the difference of the signals.

22. A device in accordance with claim 11, wherein said second detector and/or said fourth detector are located at the rear of the vehicle or on a trailer of the same and which are only activated at a minimum speed of said motor vehicle.

23. A device in accordance with claim 11, wherein said group having a first and at least one second detector include a module for the detection of vehicles without any relative speed, in other words travelling at the same speed as the vehicle fitted with said detectors, within a preset margin of tolerance.

24. A device in accordance with claim 11, wherein only said first detector of each group is fitted with a module for the detection of vehicles without any relative speed.

25. A device in accordance with claim 11, wherein said second and fourth detectors are comprised of an optical camera and present detection areas that overlap at least partially and in that said device employs stereoscopic vision techniques to determine the approximate distance and relative speed of objects detected within said detection areas, when the vehicle in motion, or the height and/or movement of objects or the distances to them, when the vehicle is parked.

26. A device in accordance with claim 4, wherein said first and second detectors are comprised of an optical camera and present detection areas that overlap at least partially and in that said device employs stereoscopic vision techniques to determine the height and/or movement of objects located within said detection areas when the vehicle is parked.

27. A device in accordance with claim 11, wherein the interconnection between at least part of the cited detectors he means of processing their input signals and the cited warning means is performed by radiofrequency communications.

28. A device in accordance with claim 1 further comprising means to display an image of at least part of the field covered by the cited cameras.

29. A device in accordance with claim 11, wherein all the detector devices comprise optical cameras working in the visible light and/or infrared spectra.

30. An active monitoring method within a safety perimeter of a motor vehicle for the detection of moving objects or static obstacles in an area of risk close to said comprising the steps of:
acquiring data from at least two differentiated detection zones within said safety perimeter by means of a group comprising a first detector that covers a first zone and at least one second detector that covers a second zone which is contiguous or partly superposed to said first zone and which extends it, defining a joint detection zone, which includes a sector of said safety perimeter, with at least one of said detectors being an optical camera suitable for working in the visible light and/or infrared spectra;
processing the signals acquired by at least two detectors; and
generating warning signals in the case of detecting an object involving risk or an insurmountable obstacle, existing in said joint detection zone, applying a "OR" logic function to said processed signals, corresponding to said first detector and to said second detector,
wherein a differentiated processing of the data captured by each detector is carried out as a function of the position occupied by each of said groups of detectors on the vehicle.

31. A method in accordance with claim 30, wherein said process comprises a simultaneous, separate treatment of the input signals provided by said first detector and second detector.

32. An active monitoring method within a safety perimeter of a motor vehicle for the detection of moving objects or static obstacles in an area of risk close to said comprising the steps of:
acquiring data from at least two differentiated detection zones within said safety perimeter by means of a group comprising a first detector that covers a first zone and at least one second detector that covers a second zone which is contiguous or partly superposed to said first zone and which extends it, defining a joint detection zone, which includes a sector of said safety perimeter, with at least one of said detectors being an optical camera suitable for working in the visible light and/or infrared spectra;
processing the signals acquired by at least two detectors; and
generating warning signals in the case of detecting an object involving risk or an insurmountable obstacle, existing in said joint detection zone, applying a "OR" logic function to said processed signals, corresponding to said first detector and to said second detector,
wherein each of the cited detectors is capable of being activated or not, of being ignored, or of carrying out differential processing of the captured data as a function of the vehicle speed.

33. A method in accordance with claim 31, wherein it comprises using several detector groups, each comprising of a first and at least one second detector employed to cover several sectors of said safety perimeter, with the detectors sharing the same warning means, specific for said group.

34. A method in accordance with claim 32, wherein it comprises using several detector groups, each comprising of a first and at least one second detector employed to cover several sectors of said safety perimeter, with the detectors sharing the same warning means, specific for said group.

* * * * *

UNITED STATES PATENT AND TRADEMARK OFFICE
CERTIFICATE OF CORRECTION

PATENT NO. : 7,378,947 B2 Page 1 of 1
APPLICATION NO. : 10/521332
DATED : May 27, 2008
INVENTOR(S) : Daura Luna et al.

It is certified that error appears in the above-identified patent and that said Letters Patent is hereby corrected as shown below:

On the Title Page, Item (86) PCT No.: "PCT/EP02/00364" should read --PCT/ES2002/000364--.

On the Title Page, Item (87) PCT Pub. No. "WO01/61371; PCT Pub. Date: August 23, 2001" should read --WO 2004/010402; PCT Pub. Date: January 29, 2004--.

Signed and Sealed this

Twelfth Day of August, 2008

JON W. DUDAS
*Director of the United States Patent and Trademark Office*